United States Patent [19]

Flynn et al.

[11] 4,102,495
[45] Jul. 25, 1978

[54] HEAT CONTROL DEVICE

[75] Inventors: M. Rutledge Flynn; Raymond P. Schultz, both of Wilkes-Barre, Pa.

[73] Assignee: Control Devices, Inc., Wilkes-Barre, Pa.

[21] Appl. No.: 761,487

[22] Filed: Jan. 21, 1977

[51] Int. Cl.² .............................................. F23N 5/20
[52] U.S. Cl. ................................. 236/46 R; 236/91 R
[58] Field of Search .............. 236/46 R, 91 R, 15 BG; 165/12; 337/302, 303, 304

[56] References Cited

U.S. PATENT DOCUMENTS

| 2,528,766 | 11/1950 | Marcellus | 337/303 |
| 2,832,870 | 4/1958 | Kucera | 236/46 X |

Primary Examiner—William E. Wayner
Attorney, Agent, or Firm—Stuart E. Beck

[57] ABSTRACT

A programmable device for controlling the amount of heat supplied to a building by opening and closing a circuit to a heat source such as an oil or gas burner or a steam valve during predetermined times and in response to the temperature of the outside air. The predetermined times can occur during a multiday cycle, such as a week. As the outside air temperature rises and falls, the circuit will be closed later or sooner, respectively. Additionally, the device can be set so that when the outside air temperature falls below a predetermined level the circuit is closed to add heat to the building notwithstanding where in the programmed cycle the device is. Conversely, the device can be set so that when the outside air temperature reaches a predetermined maximum, the circuit is opened to halt the addition of heat to the building notwithstanding wherein the programmed cycle the device is.

4 Claims, 9 Drawing Figures

FIG. 8A

AUTO
TABLE OF POSSIBLE SWITCH STATES

AT PROGRAMMED TIME (FOLLOWER 66 ON CAM EDGE 36)

| SWITCH | 52 | 74 | 92 | 130 | CIRCUIT THRU COMMON (182) AND |
|---|---|---|---|---|---|
| *O.A.T. BETWEEN UPPER & LOWER TEMP LIMITS* | | | | | |
| (1) 55 MIN | 1-2 | 1-3 | 1-2 | 1-3 | 184 HEAT OFF |
| (2) 5 MIN | 1-2 | 1-3 | 1-3 | 1-3 | 180 HEAT ON |
| *O.A.T. BELOW LOW TEMP LIMIT* | | | | | |
| (3) 55 MIN | 1-2 | 1-3 | 1-3 | 1-2 | 180 HEAT ON |
| (4) 5 MIN | 1-2 | 1-3 | 1-3 | 1-2 | 180 HEAT ON |
| *O.A.T. ABOVE HIGH TEMP LIMIT* | | | | | |
| (5) 55 MIN | 1-2 | 1-2 | 1-2 | 1-3 | 184 HEAT OFF |
| (6) 5 MIN | 1-2 | 1-3 | 1-2 | 1-3 | 184 HEAT OFF |

NOT AT PROGRAMMED TIME (FOLLOWER 66 ON EDGE 26)

| SWITCH | 52 | 74 | 92 | 130 | CIRCUIT THRU COMMON (182) AND |
|---|---|---|---|---|---|
| *O.A.T. BETWEEN UPPER & LOWER TEMP LIMITS* | | | | | |
| (7) 55 MIN | 1-3 | 1-2 | 1-2 | 1-3 | 184 HEAT OFF |
| (8) 5 MIN | 1-3 | 1-2 | 1-3 | 1-3 | 184 HEAT OFF |
| *O.A.T. BELOW LOW TEMP LIMIT* | | | | | |
| (9) 55 MIN | 1-3 | 1-3 | 1-3 | 1-2 | 180 HEAT ON |
| (10) 5 MIN | 1-3 | 1-3 | 1-3 | 1-2 | 180 HEAT ON |
| *O.A.T. ABOVE HIGH TEMP LIMIT* | | | | | |
| (11) 55 MIN | 1-3 | 1-2 | 1-2 | 1-3 | 184 HEAT OFF |
| (12) 5 MIN | 1-3 | 1-2 | 1-3 | 1-3 | 184 HEAT OFF |

FIG. 8B

MORNING WARMUP PERIOD
TABLE OF SWITCH POSITIONS WHEN O.A.T. IS BETWEEN UPPER AND LOWER LIMITS

| SWITCH | 52 | 74 | 92 | 130 | CIRCUIT THRU COMMON (182) AND |
|---|---|---|---|---|---|
| *FOLLOWER 66 ON EDGE 26 (BEFORE WARMUP PERIOD)* | | | | | |
| (1) 55 MIN | 1-3 | 1-2 | 1-2 | 1-3 | 184 HEAT OFF |
| (2) 5 MIN | 1-3 | 1-2 | 1-3 | 1-3 | 184 HEAT OFF |
| *FOLLOWER 66 LEADING EDGE 38 (DURING WARMUP PERIOD)* | | | | | |
| (3) 55 MIN | 1-3 | 1-3 | 1-2 | 1-3 | 180 HEAT ON |
| (4) 5 MIN | 1-3 | 1-3 | 1-3 | 1-3 | 180 HEAT ON |
| *FOLLOWER ON OUTER EDGE 36 (AFTER WARMUP PERIOD)* | | | | | |
| (5) 55 MIN | 1-2 | 1-3 | 1-2 | 1-3 | 184 HEAT OFF |
| (6) 5 MIN | 1-2 | 1-3 | 1-3 | 1-3 | 180 HEAT ON |

HEAT CONTROL DEVICE

This invention relates to a programmable heating control device and more particularly to a heating control device which is adapted to energize a heat source for a building during predetermined time periods and in response to the outside air temperature when that temperature falls within a predetermined range and to energize the heat source when the outside air temperature falls below said range and to de-energize the source when the temperature rises above said range.

Every heated building will loose heat to the outside through its foundation, outside walls and roof. The rate of heat loss will be proportional to the difference between the inside and outside temperatures so that at a lower outside air temperature the rate of heat loss will be higher than if the outside air temperature were higher.

Thermostats, which are often used for measuring temperature inside a building are notoriously unreliable for determining when a heat source should supply heat to a building and when it should not supply heat. This is because the thermostat can only sample the temperature in its immediate vicinity. Thus, if a thermostat is located in a portion of a building which might be warmer or cooler than other portions of the building, then a distorted reading of the internal temperature of the building will be obtained so that the heat source may supply heat when it is unneeded and not supply heat when it is needed.

Thus, if heat could be supplied to building to replace the heat which is being lost to the outside, the temperature inside the building could be maintained at a predetermined level. In this regard, it has been recognized for some time that buildings can be heated with devices that rely upon means for sensing outside air temperature rather than using systems comprising thermostats. Such devices would operate on the basis that a particular building will lose a predetermined amount of heat in a given period of time depending on the heat transfer characteristics of the building, e.g., its insulation and the difference between the temperature outside and inside the building.

Thus, a heat source of known heating capacity could be energized at intervals to supply heat to the building to replace the heat lost to the outside to thereby maintain the building at a constant temperature. The intervals during which the heat source would be energized would be longer when the outside temperature is lower and would be shorter when the outside temperature is higher.

The concept of heating a building based on the temperature of the outside air is discussed in Kucera U.S. Pat. No. 2,832,870, which shows a heat control device which is responsive to outside temperature as well as being operative to supply heat at intervals.

Further, there have been devices developed which are similar to that which is disclosed herein, however, they are not capable of being programmed to provide intervals during which heat is to be supplied to a building over a multi-day cycle.

Thus, the invention relates generally to a heat control system for selectively energizing a heat source at selected intervals during a multi-day cycle in response to temperature which comprises a plurality of switches, two arms which are pivotally mounted to a base, and two programming means. The switches are supported so that their contacts are opened and closed in response to movement of the arms and the programmers so that the source is energized to supply heat to a building at predetermined conditions.

For the purpose of illustrating the invention, there are shown in the drawing forms which are presently preferred, being understood, however, that this invention is not limited to the precise arrangements and instrumentality shown and wherein:

FIGS. 8A and 8B are tables indicating the position of each of the switches in FIG. 7 at various times during the "AUTO" cycles.

Figure 1:
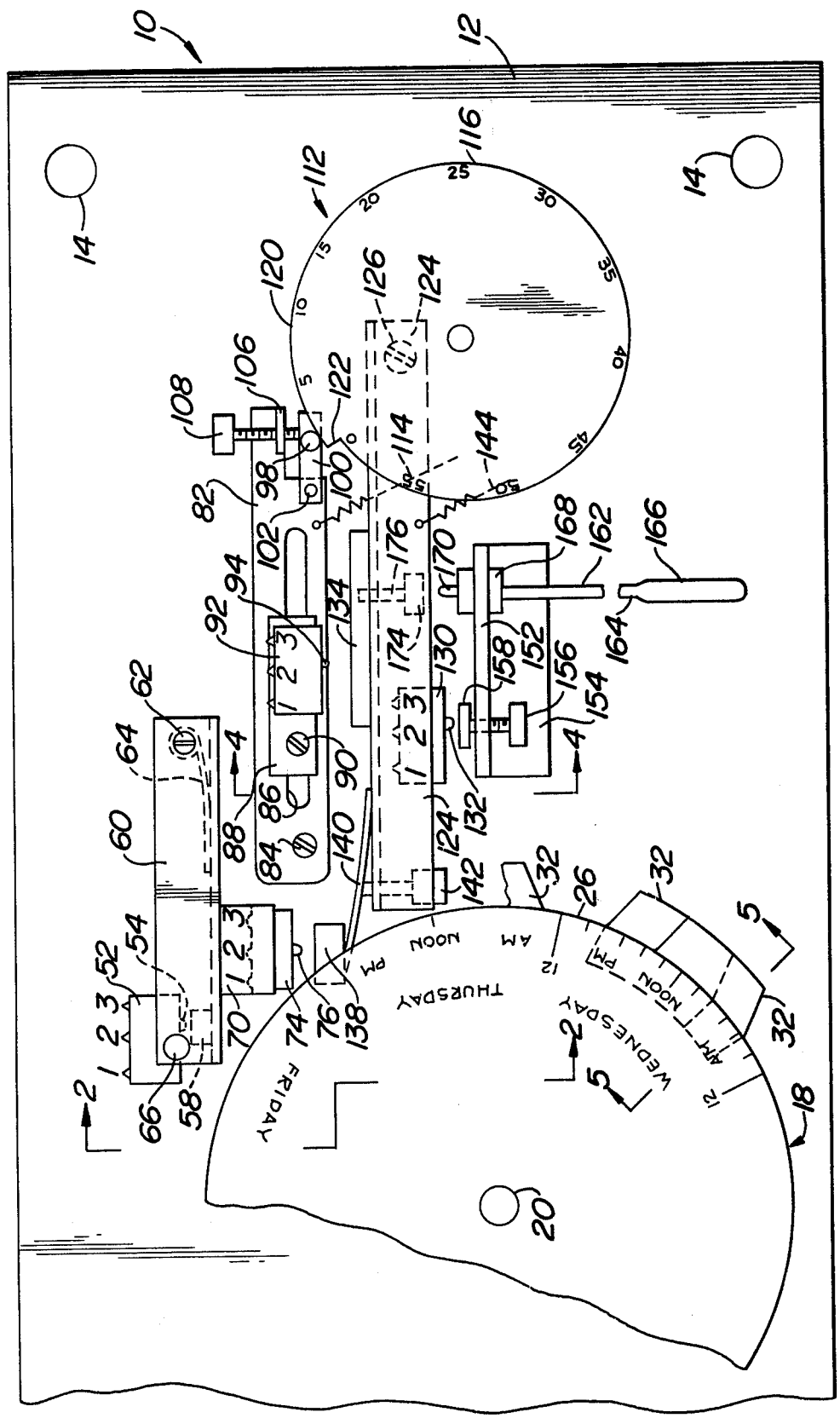
FIG. 1 is a top plan view of a heat control device constructed in accordance with a presently preferred form of the invention.

Now referring to the drawings for a detailed description of the invention, the heat control device 10 may be supported on a base 12 which may be any suitable member, such as the flat plate shown. The base may be mounted in a suitable protective container such as a metal box (not shown) by way of screws which are threaded through apertures 14 in the base.

The device includes a programming member 18 which is a disc that is mounted on a shaft 20 which extends upwardly from a timing a motor (not shown). The shaft 20 is connected to the timing motor so that it goes through a complete rotation once in seven days.

Figure 5:
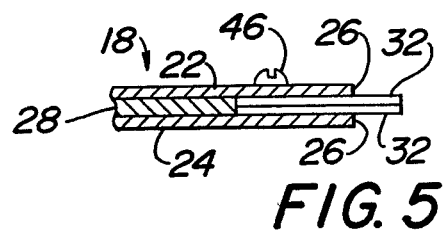
FIG. 5 is a sectional view taken along line 5—5 of FIG. 1.
Figure 4:
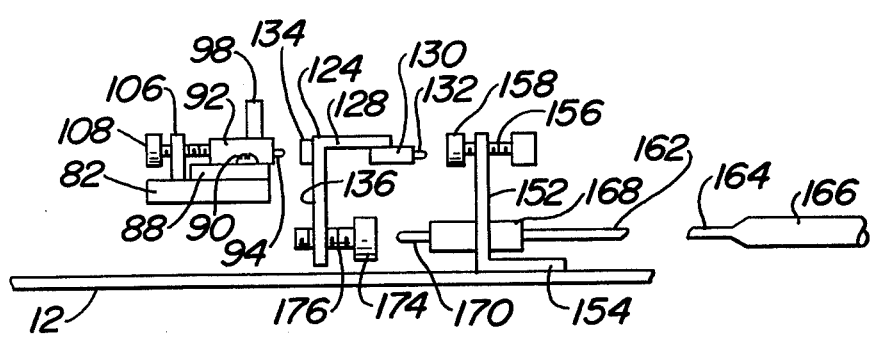
FIG. 4 is a sectional view taken along line 4—4 of FIG. 1.

As seen in FIG. 5, programming member 18 comprises upper and lower discs 22 and 24 which are generally of the same diameter and which define a circumferential edge 26 and an intermediate disc 28 of a reduced diameter. The space between the upper and lower discs adjacent the perimeter of the intermediate disc 28 is occupied by a plurality of cams 32. Each of the cams 32 is a generally elongated arcuate member having an inner edge 34 which is arcuate so that it can lie along the periphery of intermediate disc 28. It includes an arcuate outer edge 36 and sloped leading and trailing edges 38 and 40 respectively.

The cams 32 may be of sufficient thickness so that two of them may be arranged in overlapping fashion between the upper and lower discs 22 and 24.

Each of the cams has an elongated arcuate slot 42 extending through substantially its entire length. A threaded member such as screw 46 passes through appropriate openings in the upper and lower discs 22 and 24 and passes through the slots 42 in the cams 32 in order to retain them in a desired location on the programming member.

As best seen in FIG. 1, the circumference of the programming member 18 is divided into a plurality of sectors, each of which corresponds to one of the days of the week (only some of which are shown).

Since according to the circuit which is disclosed, the high portions, i.e. edges 36 of the cams 32 correspond to those time periods during which the device is programmed to supply heat to the building if necessary, the cams can be moved around the circumference of the programming member relative to screws 46 so that the device can be desirably programmed to enable heat to be supplied at any convenient time period.

For example, as illustrated in FIG. 1, on a Wednesday, the cams 32 have been arranged so that the heat can be supplied to the building from 8:00 A.M. to 11:00 P.M. If it were desired to be able to supply heat during a shorter interval, the cams 32 would be adjusted so that the extent which they overlap would be increased. If the interval during which it were desired to be able to supply heat to the building would be increased, then the cams would be moved so that the extent which they overlap was reduced thereby increasing the programmed heating time.

While the arrangement of the cams 32 has been explained with respect to only one day of the week, each of the other days of the week has its own cams 32 which can be adjusted in a similar fashion. If no programmed heating is desired on a particular day, such as a Sunday, the cam for that day could be removed.

Referring again to FIGS. 1 and 2, a first switch 52 having an operator 54 is supported on base 12. The switch operator 54 is engageable with a tab 58 which extends downwardly from arm 60. Arm 60 is an elongated member that is pivotally connected to base 12 by a pivot member 62. It is urged in a counterclockwise direction by a helical coil spring 64 which may be wrapped around pin 62 so that the tab 58 is normally urged away from the operator 54.

Arm 60 supports an upwardly extending cam follower 66 at its end which is remote from the pin 62.

The follower is positioned so that it will be urged against the camming surfaces of the programmer 18. The arm also includes a laterally directed tab 70 to the underside of which is connected a switch 74 having an operator 76 which faces in the same direction as the operator 54 of switch 52.

Figure 2:
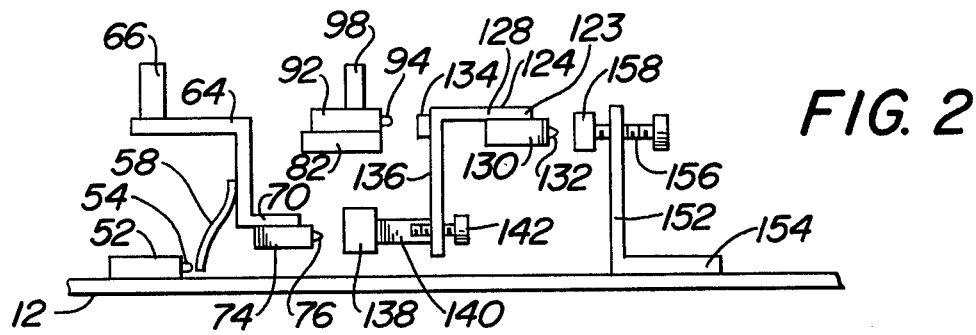
FIG. 2 is a sectional view taken along line 2—2 of FIG. 1.

Arm 82 is an elongated member that is pivotally connected to the base 12 by a pin 84 (not shown in FIG. 2). It has an elongated slot 86 in which a slide plate 88 is mounted for movement. The slide plate 88 can be positioned at any place along the slot and can be retained there by tightening set screw 90. A switch 92 having an operator 94 is mounted on the slide plate for movement therewith. The operator faces in the same direction as the operators on switches 52 and 74.

The end of the arm 82 that is spaced from pin 84 supports an upwardly extending cam follower 98 which is supported at one end of an elongated member 100 which is pivotally connected by pin 102 to the arm 82. Adjacent to and generally parallel to the elongated member 100 is an upwardly directed tab 106 with an elongated threaded member 108 extending through a threaded aperture in the tab.

By rotating threaded member 108, it can be advanced through tab 106 to move elongated member 100 and cam follower 98 closer or further away from the tab.

Figure 3:
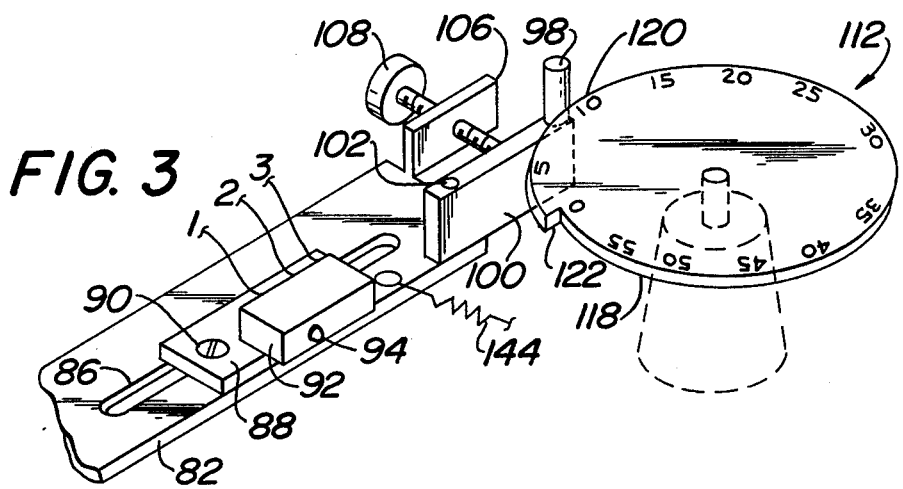
FIG. 3 is a partial perspective view of a portion of the heat control device illustrated in FIG. 1.

As best seen in FIG. 3, cam follower 98 lies along the edge 110 of a second programming cam 112. Cam 112 is supported on a shaft 114 which extends upwardly from a motor (not shown) that is mounted on base 12. The shaft may be connected to the motor in a well known manner so that it causes the cam 112 to make a complete rotation in one hour, or any other interval.

The cam follower 98 is urged in clockwise direction about pivot pin 84 by a spring 114 that may be connected between the arm 82 and the motor.

As seen in FIGS. 1 and 3 the distance of the peripheral edge 116 of cam 112 from shaft 114 increases linearly with the juncture of the low portion 118 and high portion 120 thereof being defined by a shoulder 122. The cam 112 is arranged to rotate in a clockwise direction. Its face may be provided with indicia indicating the minutes of time elapsed since shoulder 122 has moved past follower 98.

Arm 124 is pivotally connected to base 12 by a pin 126. It includes a horizontally extending flange 128 the underside of which supports a switch 130 having an operator 132.

An elongated pressure pad 134 is supported on the rear wall 136 of arm 124 to engage operator 94 on switch 92 as will be explained herein.

At its end away from pin 126 arm 124 supports switch contactor 138 which is disposed at one end of an elongated resilient tab 140 which has its other end coupled to the arm 124. The position of the contactor 138 relative to arm 124 can be adjusted by advancing elongated threaded member 142 which bears against the resilient tab in and out of a threaded aperture in the arm.

The arm 124 is urged counterclockwise about its pivot 126 by a suitable resilient member such as spring 144 which may have one end connected to the arm and its other end connected to the motor support (not shown) for cam 112.

An upwardly extending plate 152 is supported on base 12 near arm 124 by a leg 154. It includes an elongated threaded member 156 extending through a threaded aperture. Member 156 supports a switch contactor 158 which is disposed so that it can engage the switch operator 132 on switch 130.

The heat control device also includes a means which enables it to be responsive to the outside air temperature. In this regard, plate 152 supports one end of an elongated member 162 which is responsive to changes in temperature. The elongated member 162 comprises a hollow tube 164 with a bulb 166 at one end and a bellows 168 with a moveable pin 170 extending therefrom at its other end. The bellows 168 extends through an aperture in plate 152 and is fixed thereto. The hollow tube 164 and bulb 166 contain a fluid which expands in response to increases in temperature and contracts in response to decrease in temperature. This, expansion and contraction is reflected by pin 170 moving in and out of the bellows 168. The end of pin 170 is adapted to bear against the end 174 of an elongated threaded member 176 which is supported in a threaded aperture 124.

Figure 7:
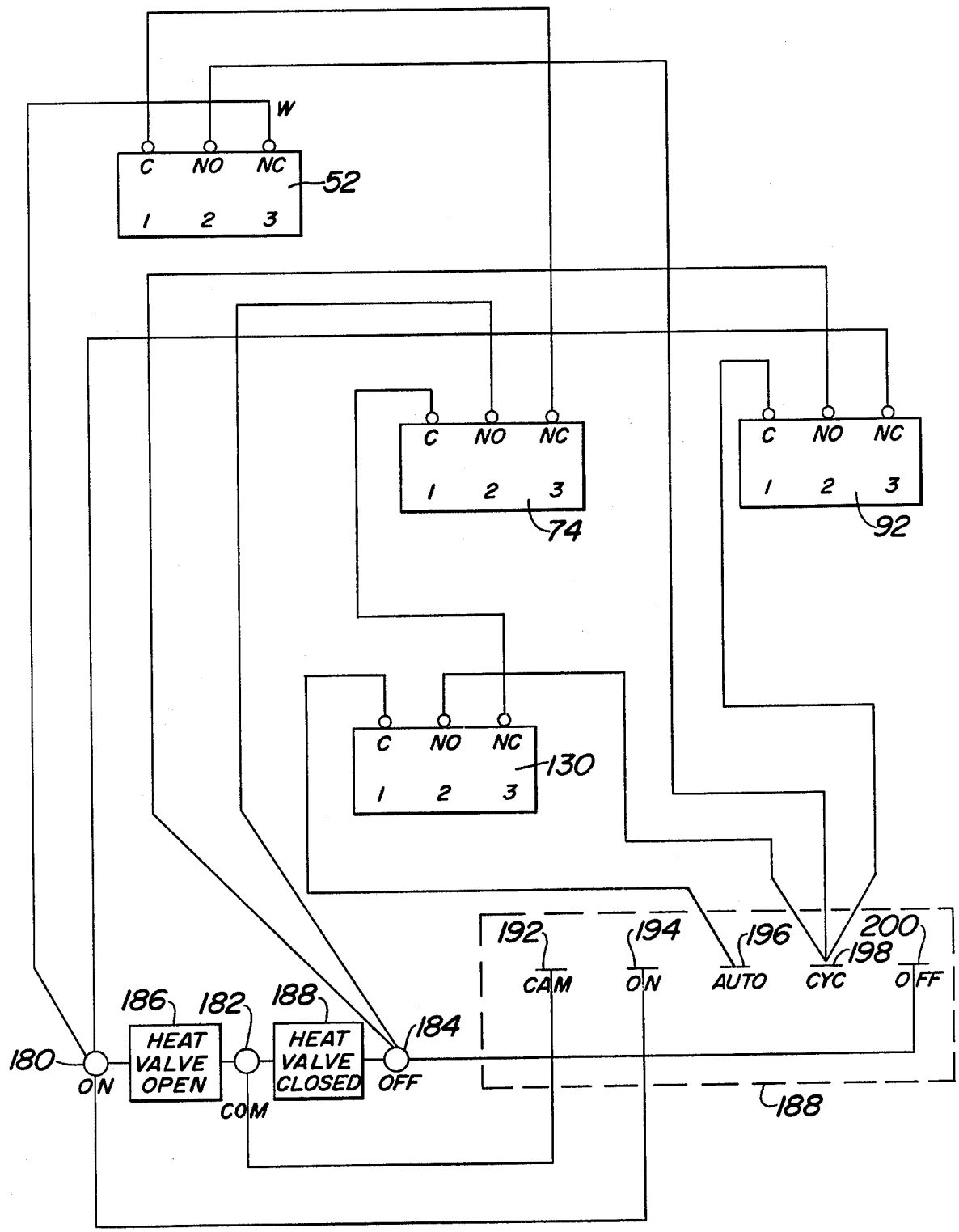
FIG. 7 is a schematic drawing of the electric circuit of the heat control device.

Referring now to FIG. 7, each of the switches 52, 74, 92 and 128 are of the single pole-double throw type. They have one common terminal which is normally closed on one of the other terminals so that normally the common terminal is not connected to the other terminal. The normal condition occurs when the operators of the respective switches are not depressed.

For the purposes of simplification, each of the common terminals for each switch is identified by the numeral "1", each normally opened terminal is identified by the numeral "2" and each of the normally closed terminals is identified by the numeral "3". Thus, a circuit through the normally opened terminal of switch 52 can be designated 1-2, while a circuit through the normally closed terminal of that switch can be designated by 1-3; the former indicating that the operator 54 is depressed and the circuit is through terminals 1 and 2 while the latter indicates that the operator 54 is not depressed and circuit is through terminals 1 and 3.

Terminals 180, 182, and 184 may be supported on base 12 in a convenient location. They may be identified as "Heat Source On", "Common" and "Heat Source Off" respectively.

A circuit completed between terminals 180 and 182 will energize the heat source by completing its circuit. In FIG. 7 the heat source is represented by the light 186 which has its circuit to its power source coupled to terminals 180 and 182. The heat source represented by the box 186 may be an oil or gas burner, or it may be the motor that opens a steam valve.

If the circuit between terminals 180 and 182 is opened, the oil or gas burner 186 would de-energized. However, the steam valve would not close.

Therefore, when the circuit between terminals 180 and 182 is opened, a circuit between terminals 182 and 184 is closed and the steam valve motor (now represented by box 188 which has its circuit to its power source coupled to terminals 182 and 184) is now energized to close the valve.

A hand switch, indicated schematically by box 188 may be provided for selecting the various modes in which the control device is to be operated. The hand switch 188 includes a common terminal 192, "ON" terminal 194, "AUTO" terminal 196, a "CYCLE" terminal 198, and an "OFF" terminal 200.

Other terminals (not shown) can be provided to supply power to the motors for programmer 18 and cam 112.

The hand switch can be manually turned to couple common terminal 192 to any one of the other terminals 194, 196, 198 or 200 depending on the manner of operation which is desired for for the device.

When the hand switch 188 is turned to complete a circuit between terminal 192 and terminal 194, the heating source is energized by way of terminals 180 and 182 and will run continuously.

When the hand switch is turned to complete a circuit between terminal 192 and terminal 200, a circuit is completed through terminals 182 and terminal 184. This circuit does not energize the heat source. However, in those systems which are steam operated and in which a valve was opened by a circuit through terminals 180 and 182, that valve can now be closed through the circuit created through terminals 182 and 184. The heat source is now shut off.

When the hand switch is turned to complete a circuit between terminal 192 and terminal 198 a circuit will be completed through switch 92 to terminal 180 or to terminal 184. The circuits including the other two lines from terminal 198 which run to the normally open terminals of switches 52 and 74 are open.

Therefore, the heat source will be energized when switch 92 is in state 1-3 and will be de-energized when the switch is in state 1-2.

The movement of switch 92 between state 1-3 and 1-2 is controlled by cam 112.

Prior to operating the heat control device the switch 92 is displaced along slot 86 until its operator is located at a place which is appropriate for the Area Design Temperature for the region in which the building which is to be heated is located.

The Area Design Temperature is the lowest temperature which can normally be expected to be reached in a particular region. It is this temperature to which the heating system for a building including the heat source and heat transfer means are designed.

In the present invention, Area Design Temperature becomes important since it, in cooperation with cam 112, determines when the operator 94 on switch 92 will be depressed.

Thus, sliding switch 92 toward the pivot pan 84 corresponds to a higher Area Design Temperature while sliding the switch away from the pivot and closer to the cam 112 corresponds to a lower Area Design Temperature. This relationship can be appreciated by referring back to the circuit diagram (FIG. 7) where it can be seen that when the operator on switch is 92 is depressed a circuit is completed through contacts 1-2 to "OFF" terminal 184. When the operator is not depressed then a circuit is completed through contact 1-3 to "ON" terminal 180. Sliding the switch 92 in the direction corresponding to a lower Area Design Temperature means that the heat source will be energized for a lesser portion of the full cycle of cam 112 for a particular outside air temperature whereas if the heating system was designed for a higher Area Design Temperature, at the same temperature the heat source will be energized for a longer portion of the full cycle of cam 112. This follows from the fact that when the switch 92 is remote from pin 84 operator 94 will be depressed for a longer portion of the cycle of cam 112. But, when it is near the pin, operator 94 is depressed for a shorter period, at the Area Design Temperature.

As seen in FIG. 1, at a particular Area Design Temperature the operator 94 on switch 92 is depressed by pressure pad 134 when follower 98 lies along the low portion of cam 112. This completes a circuit through contacts 1-2 to "OFF" terminal 184. As cam 112 rotates, its higher portion 120 will cause arm 82 to be rotated counterclockwise to move operator 94 away from pressure pad 134 until the switch returns to its normally open state where a circuit is completed through contacts 1-3 to "ON" terminal 180. When the follower 98 falls off shoulder 122 switch 92 will return to state 1-2 and the heat source will be de-energized. This cycle will repeat once each revolution of cam 112. Adjustments can be made to cause the switch to change state earlier or later in the cycle of cam 112 in response to outside air temperature and desired comfort.

If, during the cycle, the outside air temperature should rise, bulb 166 will be heated causing pin 170 to push against end 174. This will cause arm 124 to rotate clockwise and cause pressure pad 134 to depress the operator 94 on switch 92 to return it to state 1-2 where the heat source is off. If the temperature drops the arm will rotate counterclockwise to permit the cam 112 to control operator 94.

If the temperature were to drop, arm 124 would be permitted to rotate counterclockwise until it reached a point where the operator 94 would not be depressed except at the very beginning of low portion 118 of cam 112 or not at all. This would mean that switch 92 would be in state 1-3 nearly all the time, or all the time if the temperature justified it to energize the heat source. The range of movement of arm 124 is controlled by threaded member 174 against which pin 170 bears.

Additionally, further manual adjustment can be made by rotating member 108 to move switch 92 nearer or further from pressure pad 134 for a given location of the follower 98 on cam 112.

The operation of the heat control device when the hand switch completes a circuit from terminal 192 to terminal 196 can best be explained by considering it to be in control of a heat source supplied to a building or where the outside air temperature will not go above the upper limit cutoff nor go below the lower limit cutoff during the cycle of the programmer 18 and by referring to FIG. 8 which shows the state of each of switches 52, 74, 92 and 128 at various times in the cycle of programmer 18, cam 112 and under varying outside air temperatures.

Assume that the portion of the cycle which is selected for examination is during an hour of the day when the building is to be heated (such as 3:00 PM) and that cam 112 has been rotating through its cycle so that follower pin 98 on arm 82 bears against the 55 minute mark (or low portion 118 of the cam) and follower 66 on arm 64 bears against the outer edge 36 of one of the cams 32 on programmer 18. In this configuration, the operator 54 is depressed by tab 58 to put switch 52 in state 1-2. Operator 76 is spaced from contactor 136 to put switch 74 in state 1-3. Operator 94 depressed by pressure pad 136 to put switch 92 in state 1-2 while operator 132 is spaced from switch contactor 158 so that switch 130 is in state 1-3 since arm 124 which supports switch 130 is positioned by pin 170 bearing against end 174 when the outside air temperature is between the upper and lower cutoff limits. Thus, in this configuration, a circuit is completed from terminals 192, 196 and thence by way of terminals 1-3 on switch 130 terminals 1-3 on swtich 74, terminals 1-2 on switch 52 and terminals 1-2 on switch 92 to "OFF" terminal 184. Therefore, the heating unit, which is arranged between terminals 180 and 182 is not energized. This is shown in line 1 of the table of FIG. 8A.

As cam 112 rotates clockwise about its axis over the course of an hour, the follower 98 will be displaced by the gradually rising camming surface in a counterclockwise direction until arm 82 moves a distance sufficient to relieve the pressure applied by pressure pad 134 to operator 94 (as for example at five minutes). This may occur toward the end of the cycle of rotation of cam 112. When it occurs, the switch 92 will go from state 1-2 to state 1-3 thereby energizing "ON" terminal 180 to energize the heat source. This is shown in line 2 of the table in FIG. 8.

The heat source means will remain energized until cam 112 rotates to the shoulder 122 (at zero minutes) whereupon the follower 98 will fall off of the shoulder and cause the operator on switch 92 to be displaced thereby shifting that switch from state 1-3 to 1-2 to de-energize the heat source. If a steam valve had been opened, a circuit will have been completed between contacts 182 and 184 to close that valve.

If, while switch 92 is in state 1-3 to energize the heat source, the outside air temperature should rise then pin 170 will begin to move out of the bellows 168. When the upper temperature limit is reached pin 170 will begin to press against end 174 of threaded member 176. Since that threaded member is connected to arm 124, it will cause that arm to move clockwise around its pivot until switch contactor 138 engages and depresses operator 76 on switch 74. This will immediately move switch 74 from state 1-3 to state 1-2, de-energized terminal 180 and and energize terminal 184, thereby shutting down the heat source or closing the steam valve. The switch states for this condition are recited on lines 5 and 6 of the table in FIG. 8A. Note that switches 52 and 92 are not in the circuit. Therefore, the heat source is de-energized without regard to the relation of follower 98 to cam 112 even though switch 74 may move from state 1-3 to state 1-2.

From an inspection of the table shown in FIG. 8A, the states of switches 52, 74, 92 and 130 can be determined for all outside air temperatures when the device has been programmed by programmer 18 to be in that portion of its cycle when heat can be supplied. It should be noted that the heat source is de-energized except on those conditions identified by lines (2), (3) and (4).

When the programming member 18 has turned to a portion on its cycle where the follower 66 is not against the outer edge 36 of one of the cams 32 but lies along edge 26, the device is in a state where the heat source is not to be energized to supply to the building (such as at 6:00 A.M.). If the outside air temperature has not fallen below the lower limit, switch 74 is in state 1-2 while switch 130 is in state 1-3 as indicated in lines 7, 8, 11 and 12 of the table in FIG. 8A. Thus, the circuit which is created passes from common terminal 192 through terminal 196 and then through switch 130 by way of contacts 1-3 and then through switch 74 by way of contacts 1-2 to OFF terminal 184 thereby de-energizing a heating unit or closing a steam valve.

Therefore, no heat is supplied to the building. This condition prevails during the entire period of rotation of cam 112 since even though switch 92 moves between states 1-2 and 1-3 as the follower 98 moves over the low portion (55 minutes) and high portion (5 minutes) thereof since that switch is not in the circuit.

If during that time, the outside air temperature should fall below the predetermined limit, then pin 170 will withdraw inside bellows 168 thereby permitting arm 124 to rotate counterclockwise about pivot 126 until operator 132 on switch 130 is depressed by switch contactor 158 and the pressure pad 134 moves away from operator 94 on switch 92. Depression of operator 132 moves switch 130 to state 1-2 while releasing the operator 94 moves switch 92 to state 1-3. Pressure pad 134 is now so far from operator 94 that it will not be depressed during any portion of the rotation of cam 112. Thus, a circuit is then energized through terminals 192 and 196 and then through switch 130 by way of contacts 1-2 and switch 92 by way of contacts 1-3 to terminal 180 to thereby energize the heat source. The switch states for this condition are on lines 9 and 10 of the table illustrated in FIG. 8A.

If the outside air temperature were to then rise above the lower limit, then pin 172 would move arm 124 clockwise thereby removing pressure from the operator 132 so that switch 130 moves to state 1-3. Then, as long as the outside air temperature did not rise above the upper cut off temperature, a circuit would be completed through contacts 1-2 of switch 74 and thence to terminal 184 to de-energize the heat source. The switch states for this condition is shown in lines 7 and 8 of the table illustrated in FIG. 8A.

As explained earlier, from an inspection of the table shown in FIG. 8A, the states of switches 52, 74, 92 and 130 for all outside air temperatures when the device has been programmed so that the heat source is not to be energized can be seen. Energization only occurs when the outside air temperature falls below a predetermined limit as seen in lines 9 and 10.

It should be appreciated that adjustments can be made in the upper and lower temperature limits mentioned above. Also, once those adjustments have been made the time interval during which the heat source is to be energized during each cycle of cam 112 can be increased or decreased to suit the comfort of the occupant of the building.

Thus, from the preceding explanation, it is clear that switch 74 will open the circuit to the heat source by moving to state 1-2 when the outside air temperature rises sufficiently. The temperature at which the circuit through switch 74 passes through contact 2 or contact 3 can be varied by turning threaded member 142 so that it moves the switch contactor 138 closer to or further away from operator 76. Since the movement of that contactor is dictated by the expansion and contraction of pin 170 within bellows 168, switch 74 becomes a means by which the circuit to the heat source can be opened at lower temperatures by moving contactor 138 closer to operator 76 so that pin 170 need only be displaced a relatively short distance outwardly before the circuit is open. If the contactor is moved further away from operator 76 then a higher outside air temperature must be reached before the heat source is de-energized.

Typically, the upper temperature limit is set to a temperature between 55° F. and 65° F, although any temperature can be selected. To aid the user of the device, a scale could be provided adjacent the aperture through which threaded member 142 extends to relate the upper temperature limit to the angular position of member 142 or to the extent to which it extends through the wall on arm 124.

The temperature at which the heat source will be energized all the time is controlled by switch 130. The lower temperature limit can be raised or lowered by displacing threaded member 156 nearer to operator 132 on switch 130. Since that operator moves closer to the contactor 158 as the temperature drops and pin 170 withdraws inside the bellows, if the switch only has to move a short distance (corresponding to a small temperature drop) the lower temperature limit at which the system will automatically go on is raised. On the other hand, if the contactor is 158 is moved away from operator 132, then operator 132 must move a relatively large distance and the pin 170 must be withdrawin inside the bellows a substantial distance in order to depress the operator 130 (a substantial temperature drop).

To assure that the heat source will be energized, the contactor 158 should be back sufficiently so that when the operator 132 is depressed switch 92 will always be in state 1-3. Therefore, the heat source will be energized through contacts 1-2 on switch 130 and contacts 1-3 on switch 92.

Typically, the lower temperature limit is set to a temperature between 10° F. and 30° F., although any temperature can be selected. In a manner similar to that explained with respect to the upper temperature limit a scale could be provided on plate 152 to aid in properly positioning member 156 for a particular temperature.

The amount of time during the one hour rotation of cam 112 during which heat is to be supplied can be increased or reduced by displacing follower 98 toward or away from tab 106 by rotating threaded member 108. When the follower is close to the tab a substantial period of time during which the heat source is de-energized must elapse before the operator 94 on switch 92 ceases to be depressed to enable a circuit through contact 3 to energize the heater. On the other hand, when the follower is displaced a substantial distance away from the tab then the circuit through contacts 1-3 of switch 92 is completed substantially earlier in the cycle to energize the heat source sooner to thereby provide more heat in each cycle.

When the disclosed heat control device is on "AUTO" (terminals 192 and 198 are connected) the heat source can be energized for a number of hours at the beginning of the period during which heat is to be available in order to bring the building up to the desired temperature. This period may be referred to as the morning warm up period.

Figure 6:
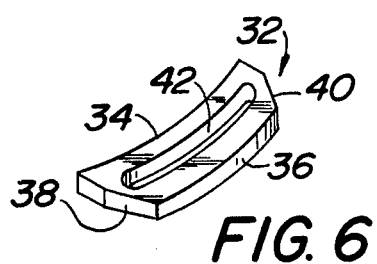
FIG. 6 is a top perspective view of a portion of the device illustrated in FIG. 5.

Referring now to FIGS. 1 and 6 and 8B leading edge 38 of each of the cams 32 is beveled so that the follower moves gradually from edge 26 to the outer edge of the cams. The bevel is necessary since it defines the time period which is used to bring the building up to the desired temperature prior to the time when the building must be warm.

As seen from lines 1 and 2 in the table shown in FIG. 8B prior to the beginning of the programmed time, the circuit to the heat source is open at both the low portion of cam 112 (55 minutes) and the high portion (five minutes). It is the same configuration as shown on lines 7 and 8 of the table shown in FIG. 8A. As programmer 18 rotates, the follower 66 starts to ride up on leading edge 38. This causes arm 60 to rotate clockwise slightly thereby moving operator 76 away from contactor 138 so that switch 74 is in state 1-3. However, the arm has not rotated sufficiently to depress operator 54. Therefore switch 52 remains in state 1-3. Therefore a circuit is completed through terminals 192 and 196, contacts 1-3 of switch 52 and terminal 180 to energize the heat source. Since switch 92 is not in the circuit, the change in state of switch 92 under the influence of cam 112 as seen in lines 3 and 4 of the table shown in FIG. 8B will have no effect on the operation of the heat source.

The heat source will remain energized for the length of time during which the follower is on the leading edge 38 of the cam 32 since during that time both switches 74 and 52 will have circuits completed through their 1-3 terminals. This interval can be as long or as short as is desired. However, a two hour period should be sufficient to warm up a building. Finally, when the follower gets to the outer edge 36 of the cam, tab 58 will depress operator 54 on switch 52 to shift it from state 1-3 to state 1-2 so that energization of the heat source will be dependent on whether cam 112 causes switch 92 to be in state 1-2 (heat source off) or state 1-3 (heat source on). This configuration is indicated by lines 5 and 6 in the table of FIG. 8B which are the same as lines 1 and 2 on the table shown in FIG. 8A so the description of its operation will not be repeated.

Thus, a heat control device has been disclosed which includes a plurality of switches which are interconnected to a plurality of pivotally supported generally parallel arms and which are operative to supply heat to a structure at a number of programmed times in the course of a cycle and at intervals in its cycle in response to the outside air temperature. Further, the device disclosed includes an upper and lower temperature limiting means which will de-energize the heat source when a predetermined upper temperature is reached and which will automatically energize the heat source when a predetermined lower temperature is reached without regard to where the device is in its programmed operation.

Further, the disclosed heat control device includes means for warming up a building at the beginning of a programmed heating cycle by continuously energizing the heating means for an extended interval, the length of which is determined by the outside air temperature.

Thus, while the invention has been described with reference to a particular form thereof, it should be apparent that many other forms and embodiments will be obvious to the persons skilled in the art, and in particular that the circuit may be rearranged so that some or all of the normally open and closed contacts on the switches may be reversed while achieving their disclosed functions. Thus, the scope of the invention should not be measured by the foregoing description, by rather, only the scope of the claims appended hereto.

We claim:

1. A heating control system for selectively energizing a heating unit at predetermined intervals during a multiday cycle in response to temperature comprising:
   a base, three switches, two arms pivotally mounted on said base and two programmers;
   said first switch being mounted to said base and including two contacts and a switch operator which is normally in contact with one of said contacts,
   said first arm including means for engaging said first switch operator to close the other of said contacts, and means for urging said arm about said pivot in a direction away from said first switch,
   said first programmer being mounted on said base for timed cyclical movement to correspond to said multiday cycle, said programmer being disposed on the opposite side of said first arm from said first switch and including a plurality of raised camming surfaces that correspond to intervals when the circuit to the heating unit is to be enabled, said raised surfaces being engagable with said first arm to move it toward and away from said first switch to selectively cause said operator to contact one or the other of said contacts,
   said second switch being mounted on said first arm for movement therewith and including two contacts and a switch operator which is normally in contact with one of said contacts,
   means for electrically interconnecting said first and second switches,
   said second programmer being mounted for timed cyclical movement for a period which is substantially less than one day, said second programmer including a linearly increasing camming surface,
   means for urging said second arm about its pivot in a direction opposite to the direction in which said first arm is urged and so that it bears against said linearly increasing camming surface,
   said third switch being mounted on said second arm for movement therewith and including two contacts and a switch operator which is normally in contact with one of said contacts when said second arm lies along the low portion of said linearly increasing camming surface and which is in contact with the other one of said contacts when said second arm lies along the high portion of said camming surface to complete a circuit through said first and second switches to energize the heating unit, and
   temperature responsive means that is operative to displace said operator in said second switch to said other contact in said second switch when a predetermined high temperature is reached to open the circuit to the heating unit.

2. A control as defined in claim 1 including a fourth switch, said fourth switch including two contacts and a switch operator which is normally in contact with one of said contacts and said temperature responsive means is operative to cause said switch operator to complete a circuit through one of said contacts on said fourth switch and through said third switch when a predetermined low temperature is reached to energize the heating unit.

3. A control as defined in claim 1 wherein the cycle of said second programmer is one hour.

4. A control as defined in claim 2 including a third arm pivotally connected to said base, means for urging third arm about its pivot in the same direction as said first arm is urged, said fourth switch being mounted on said third arm for movement therewith, and said temperature responsive means is operative to displace said third arm against the force of said urging means in response to an increase in temperature whereby said operator engages one of said contacts and in the opposite direction in response to a reduction in temperature whereby said operator engages the other of said contacts.

* * * * *